(12) United States Patent
Abdallah et al.

(10) Patent No.: US 7,525,537 B2
(45) Date of Patent: Apr. 28, 2009

(54) MAN-MACHINE INTERFACE FOR CONTROLLING ACCESS TO ELECTRONIC DEVICES

(75) Inventors: David S. Abdallah, Charlottesville, VA (US); Barry W. Johnson, Charlottesville, VA (US); Kristen R. Olvera, Charlottesville, VA (US)

(73) Assignee: Privaris, Inc., Charlottesville, VA (US)

( * ) Notice: Subject to any disclaimer, the term of this patent is extended or adjusted under 35 U.S.C. 154(b) by 0 days.

(21) Appl. No.: 12/201,568

(22) Filed: Aug. 29, 2008

(65) Prior Publication Data
US 2008/0317302 A1    Dec. 25, 2008

Related U.S. Application Data

(60) Continuation of application No. 10/997,291, filed on Nov. 24, 2004, now Pat. No. 7,420,546, which is a division of application No. 10/858,290, filed on Jun. 1, 2004, now abandoned.

(60) Provisional application No. 60/474,750, filed on May 30, 2003.

(51) Int. Cl.
*G06F 3/041* (2006.01)
(52) U.S. Cl. ...................................... 345/173; 345/156
(58) Field of Classification Search ................. 345/156, 345/173; 713/200–202; 382/115, 124, 125
See application file for complete search history.

(56) References Cited

U.S. PATENT DOCUMENTS

| | | | |
|---|---|---|---|
| 4,353,056 A * | 10/1982 | Tsikos | 382/124 |
| 4,993,068 A | 2/1991 | Piosenka et al. | |
| 5,053,608 A | 10/1991 | Senanayake | |
| 5,131,038 A | 7/1992 | Puhl et al. | |
| 5,280,527 A | 1/1994 | Gullman et al. | |
| 5,325,442 A * | 6/1994 | Knapp | 382/124 |
| 5,420,936 A * | 5/1995 | Fitzpatrick et al. | 382/124 |
| 5,469,506 A | 11/1995 | Berson et al. | |
| 5,526,428 A | 6/1996 | Arnold | |
| 5,591,949 A | 1/1997 | Bernstein | |
| 5,613,012 A | 3/1997 | Hoffman et al. | |
| 5,615,277 A | 3/1997 | Hoffman | |
| 5,799,098 A * | 8/1998 | Ort et al. | 382/125 |
| 5,805,719 A | 9/1998 | Pare, Jr. et al. | |
| 5,838,812 A | 11/1998 | Pare, Jr. et al. | |
| 5,852,670 A * | 12/1998 | Setlak et al. | 382/126 |
| 5,856,824 A | 1/1999 | Shieh | |

(Continued)

OTHER PUBLICATIONS

International Search Report and Written Opinion for PCT/US04/17270, mailed on Dec. 1, 2004; 6 pages.

*Primary Examiner*—Ricardo L Osorio

(57) ABSTRACT

The invention disclosed herein describes a man-machine interface device for controlling access to electronic devices. The man-machine interface device comprises an electronic display unit including a transparent finger touch sensor region that is seated above the display apparatus, which is responsible for determining the presence and absence of a finger and for generating fingerprint images when a finger is detected. The man-machine interface device also includes a controller unit that is coupled to the display apparatus, the finger touch sensor region, and at least one electronic device. The method of the invention describes a process for authenticating individuals and verifying their security privileges to access sensitive data, based on a finger-touch selection of an icon presented on the display apparatus of the man-machine interface device.

17 Claims, 3 Drawing Sheets

U.S. PATENT DOCUMENTS

| | | | |
|---|---|---|---|
| 5,857,028 A * | 1/1999 | Frieling | 382/116 |
| 5,870,723 A | 2/1999 | Pare, Jr. et al. | |
| 5,920,640 A | 7/1999 | Salatino et al. | |
| 5,943,043 A * | 8/1999 | Furuhata et al. | 345/173 |
| 5,952,641 A | 9/1999 | Korshun | |
| 5,952,998 A * | 9/1999 | Clancy et al. | 345/173 |
| 5,963,679 A * | 10/1999 | Setlak | 382/312 |
| 5,991,408 A | 11/1999 | Pearson et al. | |
| 6,028,950 A | 2/2000 | Merjanian | |
| 6,037,882 A * | 3/2000 | Levy | 341/20 |
| 6,038,666 A | 3/2000 | Hsu et al. | |
| 6,041,410 A | 3/2000 | Hsu et al. | |
| 6,084,968 A | 7/2000 | Kennedy et al. | |
| 6,154,879 A | 11/2000 | Pare, Jr. et al. | |
| 6,167,517 A | 12/2000 | Gilchrist et al. | |
| 6,181,328 B1 * | 1/2001 | Shieh et al. | 345/178 |
| 6,181,803 B1 | 1/2001 | Davis | |
| 6,182,221 B1 | 1/2001 | Hsu et al. | |
| 6,185,316 B1 | 2/2001 | Buffam | |
| 6,219,793 B1 | 4/2001 | Li et al. | |
| 6,256,022 B1 * | 7/2001 | Manaresi et al. | 345/174 |
| 6,268,788 B1 | 7/2001 | Gray | |
| 6,282,304 B1 * | 8/2001 | Novikov et al. | 382/125 |
| 6,282,649 B1 | 8/2001 | Lambert et al. | |
| 6,292,173 B1 * | 9/2001 | Rambaldi et al. | 345/157 |
| 6,317,834 B1 | 11/2001 | Gennaro et al. | |
| 6,327,376 B1 * | 12/2001 | Harkin | 382/124 |
| 6,353,889 B1 | 3/2002 | Hollingshead | |
| 6,366,682 B1 | 4/2002 | Hoffman et al. | |
| 6,367,017 B1 | 4/2002 | Gray | |
| 6,466,781 B1 | 10/2002 | Bromba et al. | |
| 6,484,260 B1 | 11/2002 | Scott et al. | |
| 6,487,662 B1 | 11/2002 | Kharon et al. | |
| 6,490,680 B1 | 12/2002 | Scheidt et al. | |
| 6,498,861 B1 * | 12/2002 | Hamid et al. | 382/124 |
| 6,501,846 B1 | 12/2002 | Dickinson et al. | |
| 6,529,885 B1 | 3/2003 | Johnson | |
| 6,532,298 B1 | 3/2003 | Cambier et al. | |
| 6,581,161 B1 | 6/2003 | Byford | |
| 6,603,462 B2 | 8/2003 | Matusis | |
| 6,609,198 B1 | 8/2003 | Wood et al. | |
| 6,615,264 B1 | 9/2003 | Stoltz et al. | |
| 6,618,806 B1 | 9/2003 | Brown et al. | |
| 6,636,973 B1 | 10/2003 | Novoa et al. | |
| 6,657,538 B1 | 12/2003 | Ritter | |
| 6,662,166 B2 | 12/2003 | Pare, Jr. et al. | |
| 6,668,332 B1 | 12/2003 | McNeil | |
| 6,671,808 B1 | 12/2003 | Abbott et al. | |
| 6,681,034 B1 | 1/2004 | Russo | |
| 6,719,200 B1 | 4/2004 | Wiebe | |
| 6,728,881 B1 | 4/2004 | Karamchetty | |
| 6,735,695 B1 | 5/2004 | Gopalakrishnan et al. | |
| 6,751,734 B1 | 6/2004 | Uchida | |
| 6,757,411 B2 | 6/2004 | Chau | |
| 6,765,470 B2 | 7/2004 | Shinzaki | |
| 6,766,040 B1 | 7/2004 | Catalano et al. | |
| 6,775,776 B1 | 8/2004 | Vogt et al. | |
| 6,786,397 B2 | 9/2004 | Silverbrook et al. | |
| 6,819,219 B1 | 11/2004 | Bolle et al. | |
| 6,832,317 B1 | 12/2004 | Strongin et al. | |
| 6,836,843 B2 | 12/2004 | Seroussi et al. | |
| 6,839,688 B2 | 1/2005 | Drummond et al. | |
| 6,844,660 B2 | 1/2005 | Scott | |
| 6,848,052 B2 | 1/2005 | Hamid et al. | |
| 6,850,147 B2 | 2/2005 | Prokoski et al. | |
| 6,850,252 B1 | 2/2005 | Hoffberg | |
| 6,853,739 B2 | 2/2005 | Kyle | |
| 6,857,073 B2 | 2/2005 | French et al. | |
| 6,862,443 B2 | 3/2005 | Witte | |
| 6,870,946 B1 | 3/2005 | Teng et al. | |
| 6,870,966 B1 | 3/2005 | Silverbrook et al. | |
| 6,871,193 B1 | 3/2005 | Campbell et al. | |
| 6,871,287 B1 | 3/2005 | Ellingson | |
| 6,871,784 B2 | 3/2005 | Jayaratne | |
| 6,876,757 B2 | 4/2005 | Yau et al. | |
| 6,877,097 B2 | 4/2005 | Hamid et al. | |
| 6,879,243 B1 | 4/2005 | Booth et al. | |
| 6,879,710 B1 | 4/2005 | Hinoue et al. | |
| 6,879,966 B1 | 4/2005 | Lapsley et al. | |
| 6,880,749 B1 | 4/2005 | Green et al. | |
| 6,880,750 B2 | 4/2005 | Pentel | |
| 6,883,709 B2 | 4/2005 | Joseph | |
| 6,886,096 B2 | 4/2005 | Appenzeller et al. | |
| 6,886,101 B2 | 4/2005 | Glazer et al. | |
| 6,886,104 B1 | 4/2005 | McClurg et al. | |
| 6,888,445 B2 | 5/2005 | Gotfried et al. | |
| 6,898,577 B1 | 5/2005 | Johnson | |
| 6,901,154 B2 | 5/2005 | Dunn | |
| 6,901,155 B2 | 5/2005 | Xia et al. | |
| 6,901,266 B2 | 5/2005 | Henderson | |
| 6,901,382 B1 | 5/2005 | Richards et al. | |
| 6,985,502 B2 | 1/2006 | Bunton | |
| 7,420,546 B2 * | 9/2008 | Abdallah et al. | 345/173 |
| 2002/0122026 A1 | 9/2002 | Bergstrom | |

* cited by examiner

MAN-MACHINE INTERFACE FOR CONTROLLING ACCESS TO ELECTRONIC DEVICES

RELATED U.S. APPLICATION DATA

This application claims priority to and is a continuation of U.S. patent application Ser. No. 10/997,291, entitled "Man-Machine Interface For Controlling Access To Electronic Devices", filed Nov. 24, 2004 now U.S. Pat No. 7,420,546, which is a divisional of U.S. patent application Ser. No. 10/858,290, entitled "Man-Machine Interface For Controlling Access To Electronic Devices", filed Jun. 1, 2004 now abandoned, which claims priority to U.S. Patent Application No. 60/474,750 entitled, "Secure Biometric Identification Devices and Systems for Various Applications," filed May 30, 2003, each of which is hereby incorporated by reference in their entireties.

BACKGROUND OF THE INVENTION

1. Field of the Invention

This invention relates generally to the field of electronic device user interfaces and authorization techniques, and more specifically to the field of fingerprint imaging sensors and touch screen display apparatuses.

2. Necessity of the Invention

Modern electronic devices have developed a myriad of functionalities and associated user interfaces. Many electronic devices use a display screen, such as a monitor or display apparatus, to provide feedback to the user. Handheld devices, such as the personal digital assistant and the cell phone, have an important user interface constraint—form factor. In both devices, manufacturers desire to minimize the size and weight of the device; as one means to accomplish this, the display is small and buttons are placed close together.

In recent years, manufacturers of many electronic devices have substituted touch screen technology for the traditional display. Touch screens have the same appearance and style of a traditional screen, but have the added ability to determine the location of applied pressure. This allows individuals to use a stylus in a similar manner as a person uses a mouse to point to icons on a monitor—the individual may touch the screen at the location of a particular icon. Software running on the device determines the location of the touch and determines the associated software function, such as opening an address book. Because the additional button control interface can be eliminated, manufacturers can make the display larger and simpler to use.

As the functionality of electronic devices expands, individuals may wish to protect certain data stored within the device. For example, the owner of a personal digital assistant may choose to use his PDA to send and receive private e-mail. If the data is particularly sensitive, a simple password or PIN combination may not be considered adequate security and the individual may desire to use biometric authentication on the device. The most common form of biometric authentication, fingerprint scanning, requires a hardware module that is typically the size of a postage stamp. On a device where size and weight are limited, the addition of this module can be costly.

3. Digital Fingerprint Capture Technologies

There are three common types of fingerprint capture technologies: optical, capacitive, and ultrasonic. Each of the three technologies combines its associated hardware capture mechanism, which varies from type to type, and typically a software or firmware controller. This controller is often responsible for analyzing the captured image, extracting minutia points, and creating a final template. Minutiae are points that represent all of the unique characteristics of a fingerprint—one example is the location of an intersection of ridges or valleys in the print. A template is typically composed of thirty minutiae and can be used to uniquely identify a fingerprint. This allows the scanner or other storage device to store only the requisite data points without storing the entire image.

Of the three types of fingerprint capture technologies, optical scanners are the oldest and most common, and they are composed of a glass or plastic plate with a light source and a charge coupled device (CCD) beneath. The light source is typically an array of light emitting diodes (LEDs), and the CCD is an array of light-sensitive diodes. When the finger is placed on top of the plate, the LEDs illuminate the finger and each diode of the CCD records the light that touched it, creating an image in which the ridges are dark and the valleys are light. Optical scanners are fairly resistant to temperature fluctuations, and can provide an image quality of approximately 500 dots per inch (dpi). One major concern of this technology is that latent prints—"left over" fingerprints on the plate—can cause a superpositioning effect and create error. Additionally, these types of scanners are susceptible to "gummi bear attacks", in which a fingerprint is lifted from a glass or other object, placed on a pliable and sticky material, such as a gummi bear, and can provide a false acceptance. One other point of note is that the plate must be quite large; this creates ease of use but may take unavailable real estate on a board.

Capacitive sensors are much newer than optical scanners, and are composed of an array of cells; each cell has two adjacent conductor plates, which are embedded within an insulating layer. The insulating layer is typically a glass plate. When the finger is placed on top of the insulating layer, it creates a subsequent electric field between the finger and the conductor plates, creating capacitance. Because the surface of a finger is a succession of ridges and valleys, the electric field varies over the face of the finger as the distance from the plate to the finger varies. The capacitance or voltage may be determined from the electric field, and is commonly translated into an 8-bit grayscale image with approximately 200 to 300 grid points in both the x- and y-plane. This creates more detailed data than the optical sensor. Capacitive scanners are typically smaller than optical sensors because the cells are composed of semiconductor devices, rather than a CCD unit.

While capacitive scanners are cheaper and smaller than optical sensors, their durability is unknown due to their short time in use, and the small size can make it more difficult for an individual to enroll and authenticate properly. Most fingerprint sensors use direct current (DC) coupling, although a few companies are beginning to use alternating current (AC) coupling to penetrate to the live layer of the skin. Because the capacitive scanner is dependent on the electric field and capacitance between a finger and the glass plate, the scanner cannot be fooled by the "gummi bear attack" as described above; the dielectric constant for the finger is much different from a gummi bear, and so the capacitance will vary significantly.

The most accurate but least common finger-scanning technology is ultrasound imaging. In this type of sensor, two transducers are placed on the x- and y-axes of a plate of glass—one each for receiving and transmitting—for propagating ultrasound waves through a glass plate; when the finger is placed on top of the glass, the finger impedes the waves and the receiving transducer can measure the alteration in wave patterns. This type of scanner is very new and largely untested in a variety of conditions, but initial results show promise for the technology. It combines the large plate size and ease of use of the optical scanners with the ability to pervade dirt and residue on the scanner, an advantage of capacitive scanners.

4. Touch Screen Technologies

Touch screens are quite similar to the fingerprint scanners described above. They recognize a finger pressure on the screen and typically calculate the center or peak point of the pressure. Current touch screen technologies fall under five different types of technology: analog resistive, capacitive, infrared, acoustic wave, and near field imaging. The analog resistive, capacitive and acoustic wave technologies are the most commonplace due to their clarity and endurance under a variety of conditions. Infrared is very sensitive to a light touch and may be impractical, while near field imaging is very new, suitable for very harsh conditions, and frequently cost-prohibitive. For these reasons only the first three technologies are examined in much detail. Similarly to the fingerprint scanning technology there is typically an associated software or firmware controller to perform requisite data analysis.

The analog resistive technology is composed of a glass plate and a plastic plate stacked over a flat-panel screen or display. Both the glass and plastic plates are coated with a transparent conductive material, such that the conductive material is sandwiched between the two plates. Tiny separator dots keep the two plates from touching under normal conditions, but when pressure is applied to the plastic plate, the dots move and the two surfaces come together to conduct electricity. An electronic controller instantly calculates the x- and y-coordinates, allowing resistive touch screen technologies to have very high precision and resolution. This also allows an individual to have relative freedom when selecting an object as a stylus; the individual may use a pen, finger, or other convenient utility.

Capacitive coupled technologies require the use of a conductive stylus—this may be a finger, but not a gloved hand because the cloth will prevent the conduction of charge. Capacitive technologies use a flat-panel display with a single glass plate resting on top. The glass plate is covered in a transparent metal oxide on the exterior surface; when the finger or alternate stylus comes into contact with the conductive surface; capacitive coupling occurs at the point of contact and draws electrical current. The controller registers the change in current and the x- and y-coordinates can be determined. As mentioned above, because the technology requires use of a conductive stylus, non-conductive surfaces will prevent the change in electrical current and will not have any effect on the touch screen. Furthermore, the exposed glass surface in this technology makes it susceptible to scratches and can inhibit correct operation of the screen.

Acoustic wave touch screens are more complicated than the capacitive and resistive technologies. There are two types of acoustic wave technologies: guided acoustic wave (GAW) and surface acoustic wave (SAW). Both use a single plate of glass placed on top of a flat-panel display, with a similar transducer arrangement as described above for the ultrasound imaging. GAW screens transmit a wave through the glass panel (using the glass as a waveguide), while SAW screens transmit the wave on the surface of the glass; in both technologies, transducers detect a dampening of the wave that occurs when pressure is applied to the glass, which is translated into x- and y-coordinates. Similarly to the capacitive coupled screens, SAW screens have stylus limitations; the stylus must be soft and able to absorb energy in order to dampen the wave, and are generally only practical in instances where the stylus is a finger. These types of touch screens also have the glass surface limitation described above.

5. Description of the Related Art

A multitude of single-purpose display apparatuses, fingerprint sensors and touch screens are available commercially. Furthermore, several companies offer commercial products that embed fingerprint-scanning hardware within display apparatus technology. One such example, Ethentica and Philips FDS' (a wholly owned subsidiary of Philips Corporation) joint venture TactileSense™ finger scanning hardware, comprises a transparent optical sensor that can be embedded into a pane of glass. The TactileSense optical sensor comprises a unique TactileSense polymer, a silicon glass camera/CCD, and a control ASIC. The TactileSense polymer is placed on top of the silicon camera, which is embedded within glass to provide hardness and durability. The TactileSense polymer is the heart of the sensor, comprising five layers: insulating, black-coat, transparent conductive, light-emitting phosphor, and base. The insulating and black-coat layers enhance the performance of the sensor by preventing liquid or other particles from entering the sensor, and by preventing sunlight from entering the sensor. The chief layers are the transparent conductive and light-emitting phosphor layers, which serve to supply current to the polymer and to illuminate the fingerprint. When a finger is placed on the TactileSense polymer, the polymer illuminates the fingerprint and creates an image. The silicon camera detects the illumination, and the ASIC converts it to digital format for processing.

U.S. Pat. No. 6,327,376 to Harkin describes a fingerprint sensor comprised of an array of sensing elements. The sensing elements use both capacitive and optical techniques to generate the image; the device is constructed using a transparent conductive material for the electrodes contained within. However, despite the inclusion of the sensor within a display apparatus, there is little discussion of using the display as a touch screen or user navigation interface.

U.S. Pat. No. 6,501,846 to Dickinson et al. discloses a method and system for computer access and cursor control using a relief object image generator. The relief object image generator is capable of capturing a 2-D image based on the 3-D relief of an object, such as a finger. The apparatus of Dickinson's invention can be used to simultaneously authenticate an individual's fingerprint, and move a cursor on a screen or perform other control-related functions related to the movement of the individual's finger. This application is targeted primarily at replacing mice, function keys, and other control mechanisms on devices where space is limited. However, Dickinson does not address use of biometric recognition incorporated with touch screen user navigation.

DigitalPersona also offers fingerprint-scanning hardware that is transparent and can be placed over display apparatuses, marketed as U.are.U Crystal™. This hardware is also comprised of an optical sensor that uses completely transparent materials. It is ultra-thin, enabling it to be placed in mobile or other electronic devices where real estate is a significant concern. Again, however, this product does not demonstrate any of the touch screen properties as exhibited in the current invention.

BRIEF SUMMARY OF THE INVENTION

The invention disclosed herein describes a man-machine interface device for controlling access to electronic devices. The man-machine interface device comprises an electronic display apparatus that is capable of presenting graphic text, images, icons, and other data typically shown on a screen, while further including a transparent finger touch sensor region that is seated above the display apparatus. This finger touch sensor region is responsible for determining the presence and absence of a finger, and is further responsible for generating fingerprint images when a finger is detected. The man-machine interface device also includes a controller unit that is coupled to the display apparatus, the finger touch sensor region, and at least one electronic device. The controller unit is capable of controlling data flow between the display apparatus, the finger touch sensor region and the electronic device, and for calculating finger touch locations based on a fingerprint image generated by the transparent finger touch sensor region. It can receive text from the electronic device, which is intended for presentation on the display apparatus, or conversely send a fingerprint image to the electronic device, among other functions.

The method of the invention describes a process for authenticating individuals and verifying their security privileges to access sensitive data, based on a finger-touch selection of an icon presented on the display apparatus of the man-machine interface device.

BRIEF DESCRIPTION OF DRAWINGS

Master Reference Numeral List

FIG. 1 is a schematic view of the apparatus of the invention.

FIG. 2 is a schematic view of the apparatus of the invention, when optical sensing technology is used.

FIG. 3 is a schematic view of the apparatus of the invention, when capacitive sensing technology is used.

FIG. 4 is a schematic view of the apparatus of the invention, when ultrasonic/acoustic wave technology is used.

FIG. 5 is a schematic view of the apparatus of the invention being used to authenticate to a PDA.

FIG. 6 is a flow chart of the method of the invention.

DETAILED DESCRIPTION OF THE INVENTION

The apparatus of the invention is a primary man-machine interface device that incorporates biometric authentication into a touch-sensitive display. Juxtaposing these two technologies provides a simple user interface, and additionally, an economy of space for handheld or portable devices that require ease-of-use along with biometric authentication; devices can use the functionality of a display, control keys or buttons, and a fingerprint sensor, by replacing them with the man-machine interface device of this invention.

Fingerprint scanning typically requires more detail, precision, and data analysis then touch screen technology. The most common use of fingerprint scanning is comparison between a new, "live" fingerprint, and an older stored fingerprint, where the comparison is typically between minutiae points calculated for both fingerprints. This can be used to verify or identify an individual who has already been entered into a system. If the fingerprint scanner fails to accurately analyze a print, the scanner may provide a false acceptance— reporting that the new fingerprint is the same as the old, when they actually are not—or false rejection—reporting that the two fingerprints are different when they are not. However, if a touch screen registers a touch location incorrectly, it is only a minor inconvenience to recalibrate the touch screen and renavigate the user interface.

Figure 1:
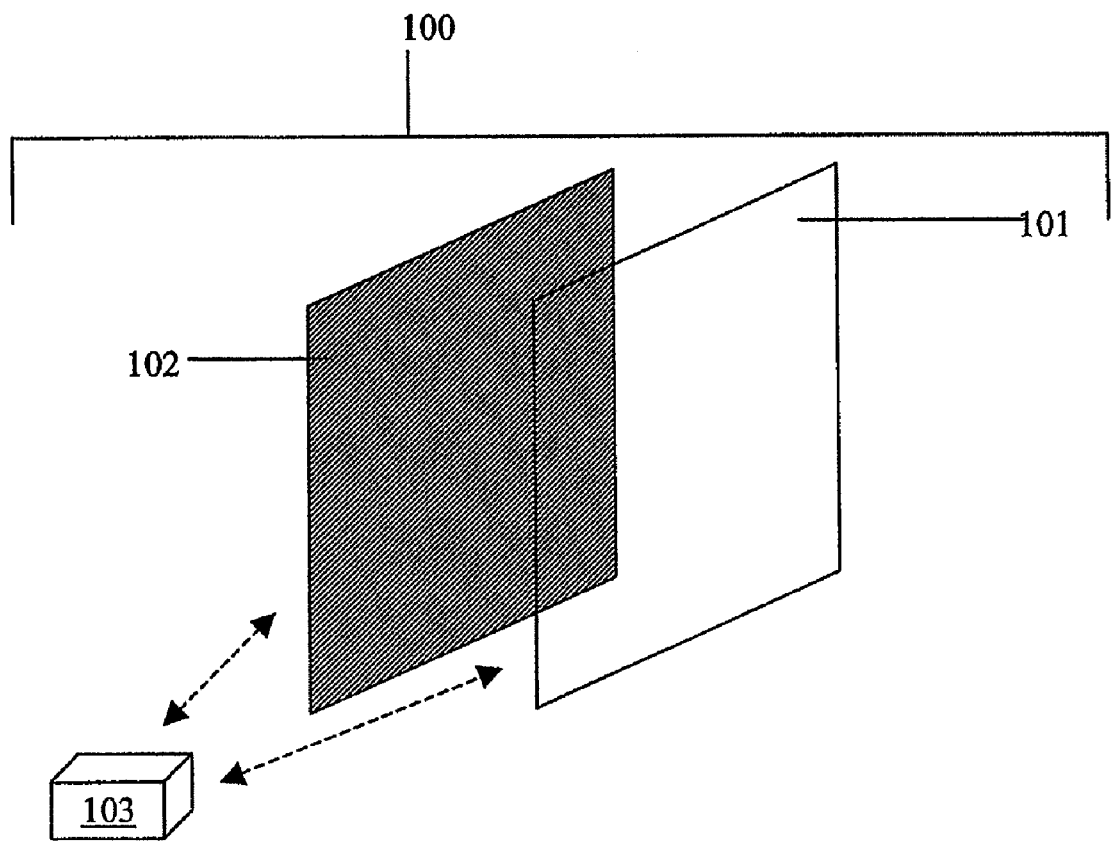
FIG. 1: Apparatus
100 Apparatus
101 Finger touch sensor region
102 Display apparatus
103 Controller

The primary embodiment of the man-machine interface device 100 incorporates a transparent finger touch sensor region 101, an electronic display apparatus 102, and a controller 103, as seen in FIG. 1. The finger touch sensor region 101 is layered on top of the display apparatus 102, and is capable of determining the presence and absence of finger touches. It can additionally generate fingerprint images, which are transmitted to, and used by, the controller 103. The display apparatus 102 must be capable of presenting graphic data, text, images, icons and other information, and may range from a cathode ray tube display, such as a television or monitor, to a liquid crystal display. The controller 103 is coupled to the finger touch sensor region 101 and the display apparatus 102, as well as peripheral electronic devices, such as a PDA.

Figure 2:
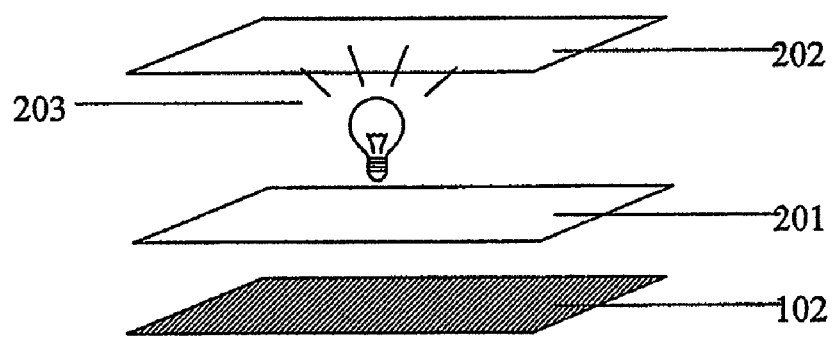
FIG. 2: Apparatus, based on optical sensor technology
102 Display apparatus
201 Charge coupled device
202 Glass or plastic plate
203 Light source

One alternate embodiment of the apparatus 100 is based on optical fingerprint scanner technology, and can be seen in FIG. 2. A plate 202 is placed over the display apparatus 102, with a light source 203 and a CCD 201 between the two. The light source 203, the plate 202, and the CCD 201 must all be transparent, or items would not be viewable on the display apparatus 102.

Figure 3:
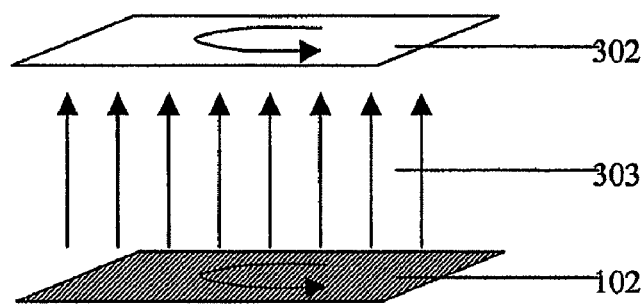
FIG. 3: Apparatus, based on capacitive sensor technology
102 Display apparatus
302 Glass plate, coated with transparent metal oxide
303 Electric field

FIG. 3 shows an alternate embodiment of the present invention, which is based on a capacitive fingerprint sensor and a capacitive touch screen. A glass plate 302 coated with transparent metal oxide is placed on top of the display apparatus 102. When the finger is placed on the glass plate of the finger touch sensor region 101, an electric field 303 is created and the finger touch location and fingerprint can be determined.

Figure 4:
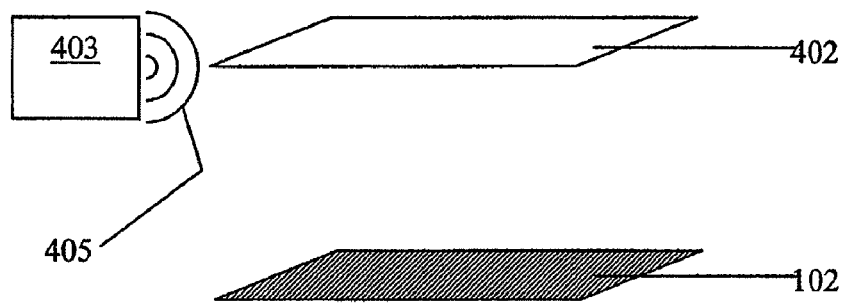
FIG. 4: Apparatus, based on ultrasonic/acoustic wave technology
102 Display apparatus
402 Glass plate
403 Ultrasonic/acoustic wave generator

Another alternate embodiment of the apparatus 100 is based on the ultrasonic imaging fingerprint sensor and the acoustic wave touch screen. This can be seen in FIG. 4. Again a glass panel 402 is placed on the display apparatus 102. Ultrasonic waves 405 are propagated by means of an ultrasonic or acoustic wave generator 403 either through or on top of the glass panel 402, using it as a wave guide. When a finger is placed on the finger touch sensor region 101 it interferes with the traveling wave, generating the fingerprint or touch location. Because the wave guide is based on the principle of total internal reflection, the angle of incidence of the propagating wave 405 must be such that it doesn't interfere with the optical properties of the display apparatus 102 behind it. This is affected by the thickness of the glass panel 402 and the frequency of the propagating wave 405.

Regardless of the embodiment of the apparatus 100, the controller 103 must be capable of receiving data from a peripherally-connected electronic device and displaying it on the display apparatus 102. The controller 103 must also be able to receive fingerprint images from the finger touch sensor region 101, and to calculate the location of finger touch events from these images. Additionally, the controller 103 is responsible for calculating minutiae points of a fingerprint associated with a finger touch on the finger touch sensor region 101. Any calculated data, such as a location or minutiae, can be transmitted from the controller 103 back to the peripheral device. If required, the controller 103 may be capable of storing fingerprint minutiae points, and/or comparing fingerprint minutiae points. In one preferred embodiment of the invention, the location can be determined by extrapolating the center point of the finger touch on the finger touch sensor region 101. However, the algorithmic choice does not fall within the scope of this invention; the location can be determined by any appropriate method.

The peripherally-connected electronic device referred to above is the device using the man-machine interface device. For example, if the man-machine interface device were to be used as a replacement for the touch screen and buttons on a personal digital assistant (PDA), the PDA would be considered the peripherally-connected electronic device. It is responsible for sending data to the controller 103 for display on the display apparatus 102, and for requesting and receiving finger touch data. Additionally, the peripherally-connected electronic device is responsible for maintaining the association between icons or text pictured on the display apparatus 102, and accessing rights for said functions.

The method of the invention provides fingerprint authentication for functions represented by an icon on a display. In the primary embodiment, the method is employed while using the man-machine interface device 100 installed in a PDA, but can be used with other suitable technology; examples explained herein will employ both. The method is intended to replace traditional user interface and authentication methods. For example, the PDA may receive e-mail, which the intended recipient wishes to keep secure. The PDA stores a registered fingerprint for the intended recipient that is associated with the security privileges of the e-mail program. Additionally, the PDA displays an icon on the display apparatus 102 that accesses the e-mail program on selection.

Figure 5:
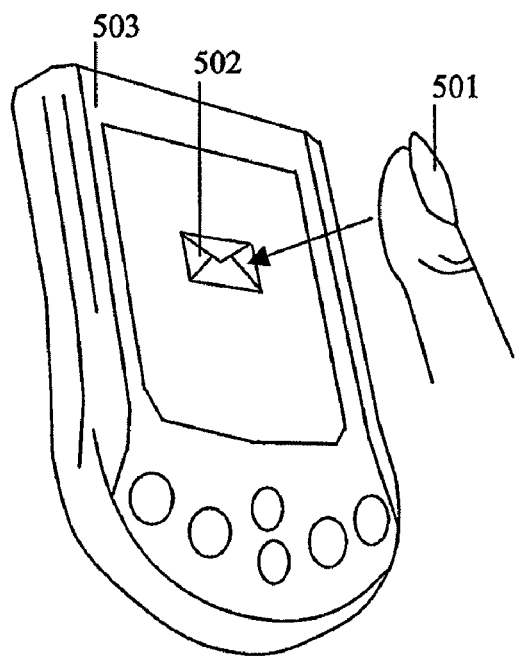
FIG. 5: Authenticating to the apparatus
501 Human thumb
502 E-mail icon
503 PDA
Figure 6:
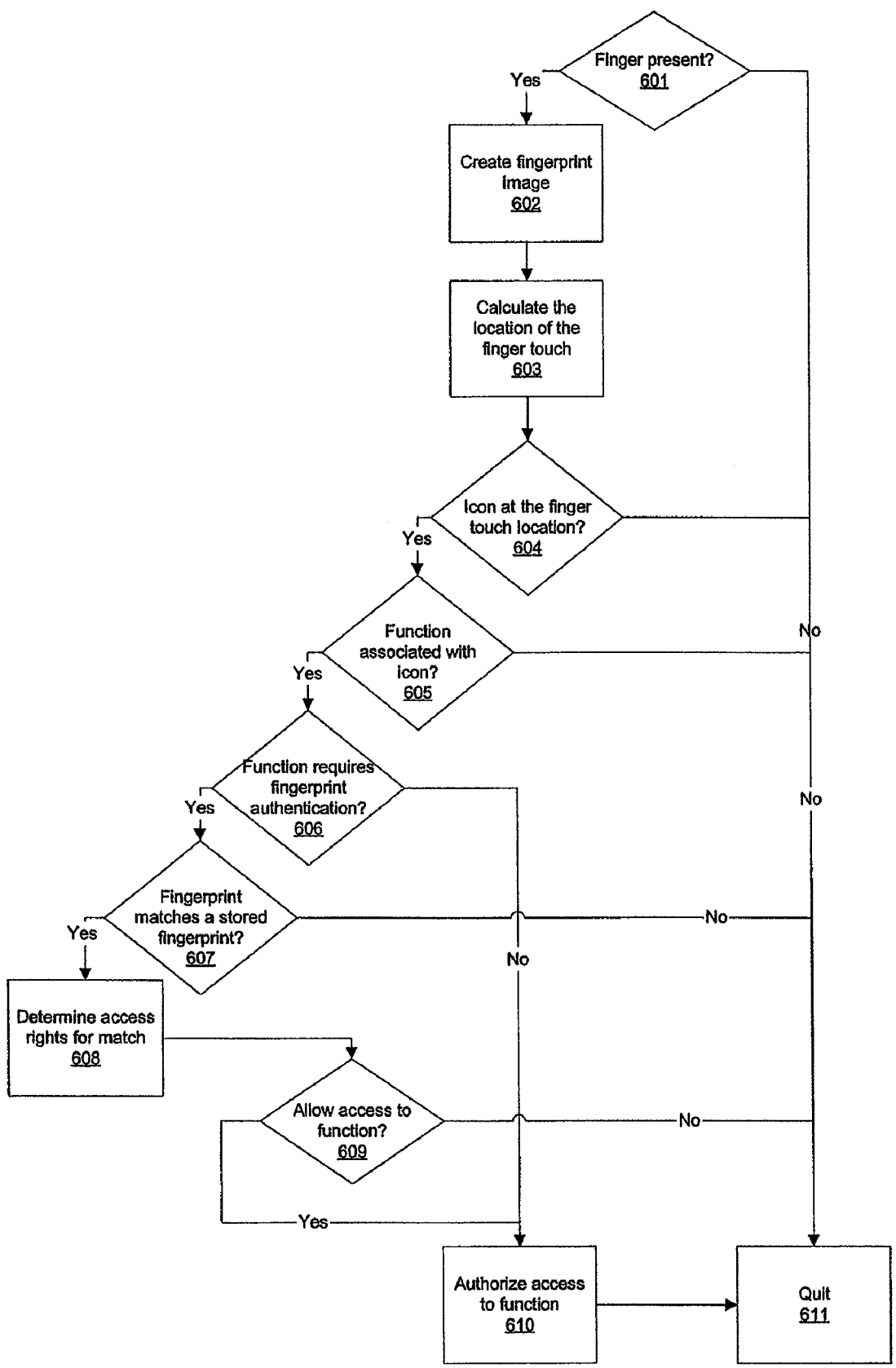
FIG. 6: Method for authenticating
601 Is there a finger present?
602 Create a fingerprint image
603 Calculate the location of the finger touch
604 Is there an icon at the finger touch location?
605 Is there a function associated with the icon?
606 Does the function require fingerprint authentication?
607 Does the fingerprint match a stored fingerprint?
608 Determine access rights for matched fingerprint
609 Allow user access to function?
610 Authorize user access to function
611 Quit

FIG. 5 shows an individual 501 using the man-machine interface device 100 of the present invention, to touch the finger touch sensor region 101 over the icon 502 displayed on the display apparatus 102 of the PDA 503—in this example, the e-mail icon. As seen in the flow chart of FIG. 6, the finger touch sensor region 101 detects the presence of the finger (step 601), and generates an image of the fingerprint (step 602), which is passed to the controller 103. The controller 103 calculates the finger touch location (step 603), and determines if there is an icon displayed on the display apparatus 102 at that location (step 604). If an icon exists, the PDA determines which function is associated with the icon (step 605) and if the function requires fingerprint authentication (step 606).

If the function does not require authentication, the PDA directly authorizes access to the function. However, in this example with e-mail, the function does require fingerprint authentication. The PDA examines stored fingerprints, verifying the new image against the stored images (step 607), until a match is found. If a match is found, the PDA determines the security privileges associated with the fingerprint (step 608) and determines if the e-mail function is among these privileges (step 609). If not, the method terminates (step 611); if it is, the PDA allows access to the e-mail function (step 610), and then terminates the authentication method (step 611).

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A processor-readable medium storing code representing instructions to cause a processor to perform a process, the code comprising code to:
   receive an icon selection input from a first user at a location of a touch screen, the location of the touch screen being associated with an icon, the icon being associated with a function;
   determine a security privilege uniquely associated with the icon and a biometric template of the first user based collectively on the icon and the biometric template of the first user, the biometric template of the first user being associated with a biometric input of the first user;
   permit access to the function associated with the icon when the security privilege uniquely associated with the icon and the biometric template of the first user permits access to that function;
   receive an icon selection input from a second user at the location of the touch screen;
   determine a security privilege uniquely associated with the icon and a biometric template of the second user based collectively on the icon and the biometric template of the second user, the biometric template of the second user being associated with a biometric input of the second user; and
   inhibit access to the function associated with the icon when the security privilege uniquely associated with the icon and the biometric template of the second user does not permit access to that function.

2. The processor-readable medium of claim 1, wherein the biometric input of the first user is a first biometric input of the first user, the location is a first location, the icon is a first icon, the function is a first function, the icon selection input from the first user is a first icon selection input from the first user, the code further comprising code to:
   receive a second icon selection input from the first user at a second location of the touch screen, the second location of the touch screen being associated with a second icon, the second icon being associated with a second function;
   determine a security privilege uniquely associated with the second icon and the biometric template of the first user, the biometric template of the first user being associated with a second biometric input of the first user from a plurality of biometric templates, the security privilege uniquely associated with the second icon and the biometric template of the first user being from a plurality of security privileges; and
   permit limited access to the second function when the security privilege uniquely associated with the second icon and the biometric template of the first user is configured to permit limited access to the second function.

3. The processor-readable medium of claim 1, wherein the biometric input of the second user is a first biometric input of the second user, the location is a first location, the icon is a first icon, the function is a first function, the icon selection input from the second user is a first icon selection input from the second user, the code further comprising code to:
  receive a second icon selection input from the second user at a second location of the touch screen, the second location of the touch screen being associated with a second icon, the second icon being associated with a second function;
  determine a security privilege uniquely associated with the second icon and the biometric template of the second user, the biometric template of the second user being associated with a second biometric input of the second user from a plurality of biometric templates, the security privilege uniquely associated with the second icon and the biometric template of the second user being from a plurality of security privileges; and
  permit full access to the second function when the security privilege uniquely associated with the second icon and the biometric template of the second user is configured to permit full access to the second function.

4. The processor-readable medium of claim 1, the code further comprising code to:
  permit access to the function associated with the icon when the function associated with the icon does not require user authentication.

5. The processor-readable medium of claim 1, the code further comprising code to:
  determine, before the security privilege uniquely associated with the icon and the biometric template of the first user is determined, the icon based on the icon selection input from the first user.

6. The processor-readable medium of claim 1, wherein the security privilege uniquely associated with the icon and the biometric template of the first user is from a plurality of security privileges, each security privilege from the plurality of security privileges is based collectively on an icon associated with a function and a biometric template of a user.

7. The processor-readable medium of claim 1, the code further comprising code to:
  inhibit, before access to the function is permitted for the first user, access to the function by the first user when the security privilege uniquely associated with the icon and the biometric template of the first user does not permit access to that function.

8. An apparatus, comprising:
  a memory configured to store a plurality of biometric templates, each biometric template from the plurality of biometric templates being associated with a security privilege from a plurality of security privileges, each security privilege from the plurality of security privileges being associated with a function from a plurality of functions;
  a touch screen configured to receive an icon selection input at a location within the touch screen, the touch screen configured to display a plurality of icons, each icon from the plurality of icons being associated with a function from the plurality of functions; and
  a processor coupled to the memory, the processor being operatively coupled to the touch screen, the processor configured to permit access to a function associated with an icon from the plurality of icons when icon selection input is received at the location within the touch screen and when the security privilege for that icon and for a biometric template from the plurality of biometric templates associated with a biometric input permits access to that icon.

9. The apparatus of claim 8, wherein the processor is configured to determine the security privilege for the icon and for the biometric template based collectively on the icon and the biometric template.

10. The apparatus of claim 8, wherein the processor is configured to permit access to the function when the location within the touch screen is independent of any security privileges.

11. The apparatus of claim 8, wherein the icon selection input is a first icon selection input, the biometric input is a biometric input of a first user,
  the processor configured to inhibit access to the function associated with the icon when a second icon selection input is received at the location within the touch screen and when the security privilege for the icon and for a biometric template from the plurality of biometric templates associated with a biometric input of a second user does not permit access to the icon.

12. The apparatus of claim 8, wherein the icon selection input is a first icon selection input, the icon is a first icon from the plurality of icons, the biometric input is a first biometric input, the location is a first location,
  the processor is configured to permit limited access to the function associated with a second icon from the plurality of icons when a second icon selection input is received at a second location within the touch screen and when the security privilege for the second icon and for a biometric template from the plurality of biometric templates associated with a second biometric input permits limited access to the second icon.

13. A processor-readable medium storing code representing instructions to cause a processor to perform a process, the code comprising code to:
  receive an icon selection input from the a user at a location of a touch screen, the location of the touch screen being associated with an icon, the icon being associated with a function;
  determine a security privilege of the user for the function based collectively on the function and a biometric template associated with a biometric input of the user, the biometric template being from a plurality of biometric templates, the security privilege being from a plurality of security privileges; and
  permit access to the function based on the security privilege of the user for the function.

14. The processor-readable medium of claim 13, the code further comprising code to:
  determine, before the security privilege of the user for the function is determined, the icon based on the icon selection input.

15. The processor-readable medium of claim 13, the code further comprising code to:
  determine, before the security privilege of the user for the function is determined, whether the biometric input of the user is authentic based on at least one biometric template from the plurality of biometric templates.

16. The processor-readable medium of claim 13, the code further comprising code to:
  inhibit access by the user to the function when the security privilege of the user for the function does not permit access to that function.

17. The processor-readable medium of claim 13, wherein the security privilege of the user for the function is from a plurality of security privileges, each security privilege from the plurality of security privileges including a plurality of access rights for the user for that function.

* * * * *